Patented June 2, 1942

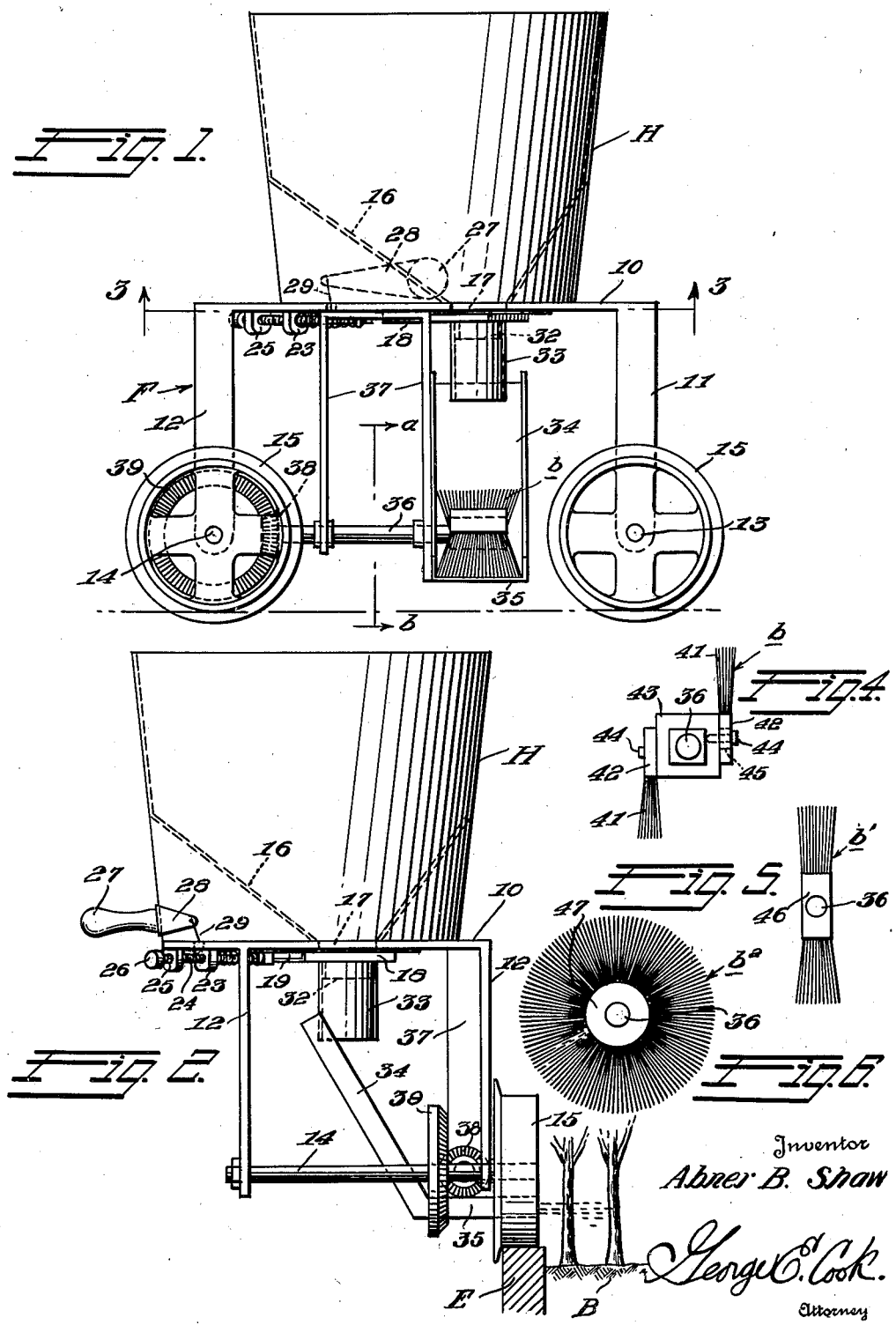

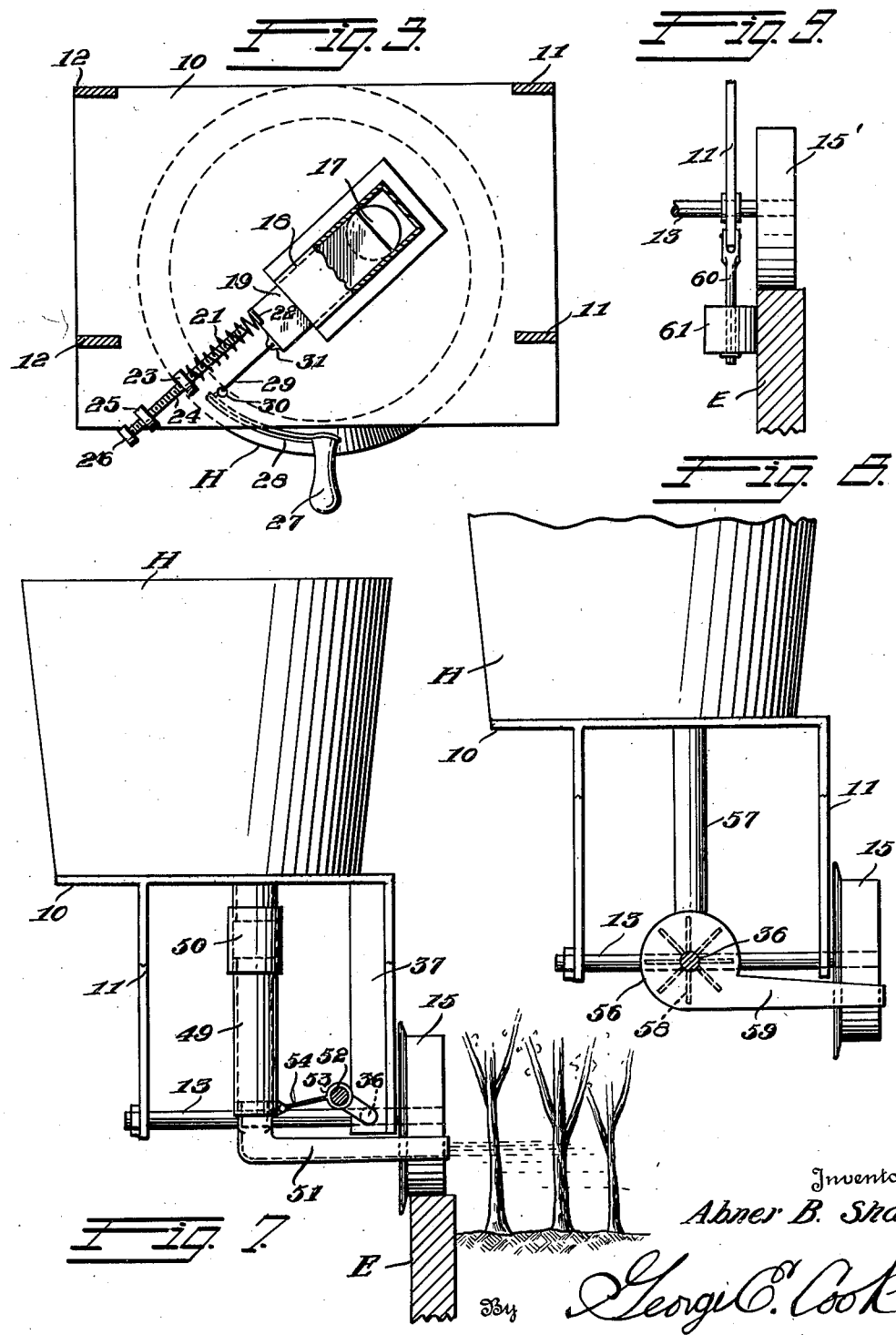

2,284,992

UNITED STATES PATENT OFFICE 2,284,992

FERTILIZER DISTRIBUTING IMPLEMENT

Abner B. Shaw, North Dartmouth, Mass.

Application December 9, 1940, Serial No. 369,341

9 Claims. (Cl. 275—2)

This invention relates to a fertilizer distributing implement.

The invention is particularly concerned with an implement for mechanically distributing dry powdered fertilizer to growing plants in benches or beds such as are found in greenhouses and the like.

As is generally known, it is the practice to periodically apply dry powdered or commercial fertilizer to growing plants in benches or beds as used in greenhouses in order to stimulate the growth of the plants.

This periodic application of fertilizer has heretofore been a manual operation, that is, the fertilizer has been applied by tossing or throwing it by a hand of a gardener on the soil between the rows of plants, which in the absence of a better and speedier process has, of course, been accepted as satisfactory.

However, such hand method of application has been found not only to be undue time-consuming, but is further objectionable in that the fertilizer is not evenly distributed as would be obvious from the very nature of such method.

It is highly important that the fertilizer be evenly distributed over the benches or beds for uniform growth of the plants and for the further reasons that fertilizer of high concentration if distributed in excess amounts to certain of the plants may prove to be injurious thereto.

Furthermore, the time element is a highly important factor in greenhouses and by substantially reducing the time required for the periodic application of fertilizer, correspondingly more time can be devoted to the many tasks always requiring the gardener's attention.

It is accordingly a primary object of this invention to provide a fertilizer distributing implement specially adapted for use with benches or beds in greenhouses and whereby fertilizer may be mechanically applied to such benches or beds uniformly as well as in a relatively short period of time.

A further object of the invention is the provision of a fertilizer distributing implement which embodies distributor actuating means so constructed as to be movable along an edge of a bench or bed as a guide whereby the fertilizer is distributed a constant distance from such edge as well as being uniformly distributed during the advance movement of the implement along such edge.

A still further object of the invention is the provision of a fertilizer distributing implement which is simple and sturdy in construction, light in weight for ease of manipulation, and which is highly efficient in uniformly distributing dry powdered fertilizer to greenhouse benches or beds in a minimum amount of time.

For a more complete understanding of the nature and objects of the invention, reference will be had to the following detailed description, taken in connection with the accompanying drawings, wherein:

Fig. 1 is a side elevational view of the improved implement in accordance with an exemplary structural embodiment thereof;

Fig. 2 is an end elevation as observed from the left of Fig. 1;

Fig. 3 is a horizontal section in a plane substantially as represented by the line 3—3 in Fig. 1;

Fig. 4 is a side elevational view of a preferred form of brush as seen on the end of the drive shaft therefor;

Figs. 5 and 6 are similar views disclosing modified forms of brushes;

Fig. 7 is a view partially in end elevation and partially in vertical section in a plane as represented by the line a—b in Fig. 1 depicting a modification of the invention;

Fig. 8 is a similar view depicting a still further modification of the invention; and Fig. 9 is a fractional view partly in elevation and partly in section depicting a still further modification of the invention.

Referring now in detail to the drawings by the use of reference characters, and referring first to Figs. 1 to 4 inclusive, F designates a suitable frame which may preferably be a light metal casting, and which in construction includes a support 10 having depending shaft bearing legs 11 at one end thereof and depending shaft bearing legs 12 at the opposite end thereof. The support 10 is adapted to support a suitable hopper H, and while the frame is thus specifically disclosed it may be of various other structural forms so far as invention is concerned.

The legs 11 rotatably support a shaft 13 and the legs 12 rotatably support a shaft 14. A relatively wide flanged wheel 15 is secured to each of the shafts 13 and 14 outwardly of the alined side legs 11 and 12 as particularly indicated in Fig. 2, the flanged wheels being adapted to roll along the edge E of a bed or bench B with the remainder of the implement on the opposite side of the plane of such legs for non-encroachment upon plants within the bed B.

The hopper H is destined to contain a quantity of dry powdered fertilizer and is provided with a lower frusto-conical wall 16 terminating at its lower end in an aperture in registry with an aperture 17 in the support 10.

Suitably secured to the lower face of the support 10 is a feed control device comprising a housing 18 disposed over the aperture 17 and having a slide plate or shutter 19 slidably disposed therein.

The shutter 19 is normally retained in aperture closing position by means of a spring 21 bearing at one end thereof against a lug 22 on the shutter and at the opposite end thereof against a lug 23 depending from the support 10, the spring encircling a screw threaded rod 24 threadedly engaged in an aperture in the lug 23 as well as a similar lug 25.

The rod 24 is provided with a manipulating head 26 whereby the distance to which the shutter 19 can be retracted is varied by turning the head 26 in one or the opposite direction with a corresponding variation of the distance of the free end of the rod from the shutter lug 22.

A shutter retracting handle 27 is swivelly mounted on the hopper H adjacent the lower end thereof and has secured thereto an arcuate lever arm 28 to the free end of which is secured one end of a cord or wire 29 which extends through an aperture 30 in the support 10 and has its opposite end secured to the shutter 19 as at 31.

It will readily be seen that this shutter structure readily enables an operator to retract the shutter to a variable extent as governed by the adjustable rod 24 for admitting any desired amount of fertilizer through the aperture 17 and upon release of the handle 27 the spring 21 will immediately restore the shutter 19 to its aperture closing position.

The housing 18 is provided with a depending nipple 32 in alinement with the aperture 17 and a vertical spout 33 is telescoped over and suitably secured to the nipple.

The lower end of the spout 33 is disposed adjacent the upper end of the inclined portion 34 of a chute which in addition to the inclined portion includes also a horizontal portion 35 whose free end terminates between and adjacent the outer plane of the wheels 15. Means are provided to positively eject the fertilizer from the horizontal portion 35 of the chute and such means are in accordance with the invention driven through tractive rotation of one of the wheels 15, and which preferably is the rear one and will be so understood.

In the preferred embodiment of the invention, the ejecting or discharging means includes a suitable brush b revolvable in the horizontal portion 35 of the chute and secured to the forward end of a shaft 36 which intermediate its ends has bearings in legs 37 of a supplemental frame member suitably secured to the support 10, one of the legs 37 may desirably be extended for support of the chute as illustrated in Fig. 1. Additional chute support means may be provided as need therefor may appear.

The rear end of the shaft 36 is provided with a bevel pinion 38 in operative mesh with a ring gear 39 secured to the shaft 14 inward of the corresponding wheel 15.

The pinion 38 and ring gear 39 are so proportioned that the brush shaft 36 will make many revolutions to each revolution of the shaft 14 as induced by rolling movement of the wheel 15 over the bed edge E, whereby the fast revolving brush b will discharge the fertilizer from the horizontal chute portion 35 with a resulting uniform distribution thereof over the bed B.

The brush b may assume various forms, the form illustrated in Fig. 4, however, is preferable for the reason that it provides a greater sweep in the horizontal chute portion 35.

This brush structure b includes, in fact, two separate brushes 41 having backs 42 secured to a block 43 on the end of shaft 36 and in order to provide for wear of the ends of the brush bristles, the backs 42 may be adjustably secured to the block 43 as by bolts 44 extending into block 43 and through elongated slots 45 in the brush backs 42. While less desirable, the brush $b^1$ may be of simpler construction as indicated in Fig. 5 wherein the opposed packs of bristles are carried by a block 46 secured to the end of shaft 36.

Furthermore, the brush $b^2$ may be continuous and circular as indicated in Fig. 6 wherein the bristles are carried by a circular block 47 on the end of the shaft 36.

Means other than the brushes may be used within the scope of the present invention, and while probably less efficient than the brushes, two modified fertilizer discharge means are illustrated in Figs. 7 and 8.

In accordance with the embodiment of Fig. 7 a spout 49 is provided which includes a flexible joint 50, such e. g. as a rubber sleeve, the lower end of the spout being secured to the neck of an open horizontal chute 51. The shaft 36 is provided with a crank 52 on which is journalled a strap 53 having a rod connection 54 with the spout 49. Thus upon rotation of shaft 36 the horizontal chute 51 will be rapidly vibrated resulting in the fertilizer being ejected from the free end thereof and into the bed B.

According to the modified embodiment of Fig. 8, the shaft 36 is displaced to the left which may readily be accomplished by securing the ring gear 39 to shaft 14 at a distance further away from the corresponding traction wheel 15.

The end of shaft 36 extends into a fan housing 56 into which opens the spout 57. The end of the shaft is provided with blower vanes 58 which rapidly propel the fertilizer delivered through spout 57 laterally into the plant bed through the discharge chute 59.

While the brushes are at present found to be the preferable means for discharging fertilizer from the chute laterally of the plane of the propelling wheels and into a plant bench or bed, other means such as those shown in Figs. 7 and 8 may be used without materially affecting the essential features of the invention which particularly resides in wide flanged supporting and transporting wheels for engaging and accurately guiding the implement along the edge of a plant bench or bed together with means operable by one of such wheels and acting to direct the fertilizer laterally of the implement into a bed or bench in a uniform layer and in an amount determined by adjustment of the shutter 19 and the rate of movement of the implement along the edge E of the bed B.

While it is preferable to use flanged wheels for guidance of the implement along the edge of a plant bed, other means such, for example, as illustrated in Fig. 9 may be effectively used. In accordance with this modified construction a truly cylindrical or flangeless wheel 15' may be used and to maintain it against encroachment upon the bed, a roller 61 is provided for engagement with the vertical side of the bed, such roller being carried on a shaft 60 suitably supported by a leg 11 or 12.

It is to be understood, of course, that the implement is manually urged toward the bed by the operator with the flanged wheels or when using the rollers 61.

It is to be particularly noted that as indicated in Figs. 2 and 7, the fertilizer is distributed under the main plant growth, or close to the soil whereby the plants are not endangered as may occur if the fertilizer lodged on the upper soft plant growth.

While I have disclosed a tub-form hopper supported on the frame F it is to be understood that other forms of hoppers may be used. In fact, hoppers of different forms and capacities could be used for transportation on the back or shoulders of the operator, the fertilizer being fed to the implement as by means of a flexible tube.

While I have disclosed certain specific embodiments of my invention only, such are to be considered as illustrative, and not restrictive, the scope of the invention being defined in the subjoined claims.

What I claim and desire to secure by U. S. Letters Patent is:

1. A fertilizer distributing implement comprising a frame, a fertilizer receiving hopper supported on the frame, a pair of longitudinally alined transporting wheels journalled on the frame and disposed to one side thereof, a chute supported by the frame, means for delivering fertilizer from the hopper into the chute, a shaft parallel with the plane of said wheels and operatively connected with one of the wheels for rotation thereof, and means operatively connected with the shaft for discharging fertilizer from the chute.

2. A fertilizer distributing implement according to claim 1 wherein said means for delivering fertilizer from the hopper into the chute comprises a handle swivelly mounted on the hopper, a spring retracted slide controlling a passage between the hopper and chute, and a flexible element interconnecting the handle and slide.

3. A fertilizer distributing implement according to claim 1 wherein said wheels are journalled exteriorly of depending legs embodied in said frame for positioning of said frame completely to one side of said wheels, and wherein said wheels are relatively wide for guiding support on the edge of a plant bed.

4. A fertilizer distributing implement according to claim 1, wherein said last means comprises a pair of brushes supported for adjustment transversely of said shaft.

5. A fertilizer distributing implement comprising a frame, a fertilizer supply hopper supported on the frame, a pair of transporting wheels rotatably supported by the frame and disposed in longitudinal alinement outside the confines of the frame, a substantially horizontal chute between said wheels and extending at right angles to the plane thereof, means for conveying fertilizer from the hopper into the chute, a shaft within the frame and parallel with the plane of said wheels, means interconnecting the shaft with one of said wheels for rotation thereof, and means operatively connected with said shaft for discharging fertilizer from said chute laterally of said frame.

6. A structure according to claim 5, wherein said last means comprises a rectangular block connected with said shaft, and a pair of brushes adjustably supported by opposed faces of said block.

7. A structure according to claim 5, wherein said last means comprises a connection with said shaft for vibrating said chute.

8. A structure according to claim 5, wherein said last means comprises a blower operatively connected with said shaft and interposed between said first means and said chute.

9. A fertilizer distributing implement comprising a frame including a substantially rectangular horizontal support and a pair of laterally disposed depending legs at each end of the support, a fertilizer supply hopper supported above said support, a shaft rotatably supported in each of said pairs of legs, a transporting wheel secured to each shaft externally of a leg of the corresponding pair, a shaft rotatably supported by said frame between the legs of the opposing pairs and extending transversely of said first shafts, a speed increasing drive connection between said last shaft and one of said first shafts, a fertilizer distributing chute supported by the frame, means for feeding fertilizer from said hopper into said chute, and means operatively connected with said last shaft for discharging fertilizer from said chute laterally of the frame.

ABNER B. SHAW.